UNITED STATES PATENT OFFICE.

JAMES G. TARR AND AUGUSTUS H. WONSON, OF GLOUCESTER, MASSACHUSETTS.

IMPROVEMENT IN PAINTS FOR SHIPS' BOTTOMS.

Specification forming part of Letters Patent No. 40,515, dated November 3, 1863; reissue No. 2,722, dated August 6, 1867; reissue No. 4,599, dated October 17, 1871.

DIVISION B.

*To all whom it may concern:*

Be it known that we, JAMES G. TARR and AUGUSTUS H. WONSON, both of Gloucester, in the county of Essex and State of Massachusetts, have invented an Improved Paint for Ships' Bottoms; and we do hereby declare that the following is a full and exact description thereof, and of the mode of making the same.

The object of our invention is to prevent the fouling of the bottoms of ships by the adhesion of barnacles, sea-weeds, and other substances; and this we effect by means of our improved paint or composition, which is applied to the hull of a vessel with a brush in the ordinary manner.

When one hundred gallons of paint is to be made we proceed as follows: Into a vat or tank of suitable size we pour forty gallons of Stockholm tar, and mix with this thirty gallons of benzine or naphtha, which must be added gradually, a few gallons at a time, and rapidly stirred. When the benzine or naphtha is all put in, the mixture should be stirred for about half an hour, or until the ingredients are well incorporated. The vat must then be closed with a tight-fitting cover and allowed to stand for about twenty-four hours. During this time a deposit takes place, the residuum consisting principally of heavy matters that are not soluble in the benzine or naphtha; the quantity thus deposited being usually about one gallon to each ten gallons of the mixture. The part remaining liquid is now drawn into another vat, and thirty gallons of dry oxide of copper, finely pulverized, are added to it, and after being well stirred the paint is ready for use. About seven gallons of paint prepared as above described are required for one coat on a vessel of one hundred tons.

We prefer to employ the oxide of copper made from the pyritous friable ores, because, besides being easily reduced to fine powder, these contain mineral and earthy substances, such as various other metallic oxides, sulphur, &c., which serve to divide the particles of oxide of copper, interposing between them substances which dissolve more slowly than they do, or which do not dissolve at all, it being desirable that the solution should be less rapid than would take place with pure oxide of copper, and yet sufficient to give the necessary protection to the bottom. The proportion in which these earthy and mineral matters are mixed with the copper oxide will vary greatly with the quality of the ore used; and it may be found desirable, in mixing any mineral or earthy matters with the oxide of copper for the above-described purpose, that their proportions should so vary with reference to varying lengths of voyages to be made and the nature of the waters in which they are to be made. All that is needed is that there shall be a proper base, such as these earthy matters furnish, to retard the solution of the copper oxide and to give durability to the paint.

The proportions of the tar and benzine above described are specified simply as, in our judgment, the most suitable; and they may be greatly varied, according to the kind and quality of the tar employed, as they are designed merely for a vehicle or medium. In place of the naphtha or benzine any known diluent may be employed. The result of mixing should be the production of a vehicle of about the consistency of linseed-oil.

We are aware that salts of copper, such as verdigris, mixed with linseed-oil, have been long used for protecting ships, and that a patent has been granted to Charles Wettersted for the use of pure metallic alloys of copper and other metals in the form of powder, mixed with vegetable tar and linseed oil, boiled with litharge or with naphtha for such purpose. In sections of his specification he refers to the protection of iron by the use of a paint composed of metallic alloys and pure oxide of copper prepared in a particular manner as an outer coating or glazing paint to be applied upon his paint before mentioned. Reference is also made to the galvanic protection his metallic alloys afford and a ship's paint which may be made of pulverized antimony and pure oxide of copper, which, however, by reason of the ready solubility of the antimony in water, could not make a practicable ship's paint.

We disclaim all such mixtures as are here referred to. Our invention is based upon the use of oxide of copper, yielding a poisonous solution in water, together with such earthy and mineral matters as separate the particles of the oxide and retard such solution, thus obtaining a paint which protects bottoms practically as well as copper sheathing or yellow metals, and at much less cost.

What we claim is—

A paint made of oxide of copper with a basis and medium, substantially as described.

JAMES G. TARR.
AUGUSTUS H. WONSON.

Witnesses:
N. AUSTIN PARKS,
J. HENRY TAYLOR.

(107)